United States Patent
Ando et al.

(10) Patent No.: US 12,103,120 B2
(45) Date of Patent: Oct. 1, 2024

(54) SPATTER COUNTING METHOD, COMPUTER PROGRAM, AND SPATTER COUNTING DEVICE

(71) Applicant: TAIYO NIPPON SANSO CORPORATION, Tokyo (JP)

(72) Inventors: Koji Ando, Tokyo (JP); Tomoaki Sasaki, Tokyo (JP); Katsunori Wada, Tokyo (JP); Yusaku Nanao, Tokyo (JP)

(73) Assignee: TAIYO NIPPON SANSO CORPORATION, Tokyo (JP)

( * ) Notice: Subject to any disclaimer, the term of this patent is extended or adjusted under 35 U.S.C. 154(b) by 1027 days.

(21) Appl. No.: 17/043,240

(22) PCT Filed: Apr. 17, 2019

(86) PCT No.: PCT/JP2019/016485
§ 371 (c)(1),
(2) Date: Sep. 29, 2020

(87) PCT Pub. No.: WO2019/203276
PCT Pub. Date: Oct. 24, 2019

(65) Prior Publication Data
US 2021/0016383 A1   Jan. 21, 2021

(30) Foreign Application Priority Data

Apr. 20, 2018   (JP) ................ 2018-081895

(51) Int. Cl.
*B23K 9/095* (2006.01)
*B23K 9/09* (2006.01)
*B23K 9/32* (2006.01)

(52) U.S. Cl.
CPC ............ *B23K 9/0956* (2013.01); *B23K 9/093* (2013.01); *B23K 9/32* (2013.01)

(58) Field of Classification Search
None
See application file for complete search history.

(56) References Cited

U.S. PATENT DOCUMENTS

| | | | |
|---|---|---|---|
| 2012/0152916 A1 | 6/2012 | Oowaki et al. | |
| 2016/0077519 A1* | 3/2016 | Punzenberger | B23K 31/125 702/81 |

(Continued)

FOREIGN PATENT DOCUMENTS

| | | |
|---|---|---|
| JP | 2008-126274 | 6/2008 |
| JP | 2009-028775 | 2/2009 |

(Continued)

OTHER PUBLICATIONS

Machine translation of WO-2011024904-A1, Dec. 2023.*

(Continued)

*Primary Examiner* — Geoffrey S Evans
(74) *Attorney, Agent, or Firm* — Nixon & Vanderhye P.C.

(57) ABSTRACT

One object of the present invention is to provide a technique capable of counting the spatters by a simple method while suppressing costs, and the present invention provides a spatter counting method performed by a portable terminal device provided with an image capturing device comprising: an image capturing step of capturing a moving image of an area including spatters generated during welding: and a counting step of counting a number of the spatters captured in each still image constituting the moving image captured in the capturing step.

15 Claims, 7 Drawing Sheets

(56) References Cited

U.S. PATENT DOCUMENTS

2016/0203596 A1    7/2016  Kodama et al.
2019/0130253 A1*  5/2019  Schultz .................. G06N 3/045

FOREIGN PATENT DOCUMENTS

| JP | 2014014857 A * | 1/2014 | |
|---|---|---|---|
| JP | 2017-060968 | 3/2017 | |
| WO | 2011/024904 | 3/2011 | |
| WO | WO-2011024904 A1 * | 3/2011 | ............. B23K 26/03 |
| WO | WO-2015037457 A1 * | 3/2015 | ............ B23K 26/032 |

OTHER PUBLICATIONS

Machine translation of Japan Patent document No. 2014014857-A, Dec. 2023.*
Machine translation of WO-2015037457-A1, Dec. 2023.*
Extended European Search Report dated Nov. 26, 2021 issued in European Application No. 19787779.8 (8 pages).
Jeong, Young-Cheol, et al., "Simple Monitoring of Welding Spatter for Quantification and Observation Using a Mobile Phone", Advances in Mechanical Engineering, vol. 9, No. 9, Sep. 1, 2017, XP055863182, ISSN: 1687-8140; https://journals.sagepub.com/doi/pdf/1.01177/1687814017725247 (9 pages).
International Search Report for PCT/JP2019/016485 mailed May 28, 2019, 2 pages.

* cited by examiner

| MOVING IMAGE ID | MOVING IMAGE DATA | STILL IMAGE ID | STILL IMAGE DATA | NUMBER OF SPUTTERS | STATISTICAL VALUE 142 | | | |
|---|---|---|---|---|---|---|---|---|
| | | | | | MAXIMUM VALUE | MINIMUM VALUE | CUMULATIVE VALUE | AVERAGE VALUE |
| A | A1 | B | B1 | 3 | 265 | 0 | 4000 | 83 |
| | | ⋮ | ⋮ | ⋮ | | | | |
| | | Z | Z1 | 5 | | | | |
| ⋮ | ⋮ | ⋮ | ⋮ | ⋮ | ⋮ | ⋮ | ⋮ | ⋮ |

FIG. 8

| NUMBER OF SPUTTERS COUNTED IN EMBODIMENT OF THE PRESENT INVENTION (piece) | NUMBER OF SPUTTERS COUNTED BY VISUAL OBSERVATION (piece) | RATIO OF NUMBER OF SPUTTERS IN EMBODIMENT OF THE PRESENT INVENTION WITH RESPECT TO NUMBER OF SPUTTERS BY VISUAL OBSERVATION (%) | CAPTURING CONDITIONS | | | IMAGE ANALYSIS CONDITIONS | |
|---|---|---|---|---|---|---|---|
| | | | SHUTTER SPEED (second) | ISO SENSITIVITY (-) | FRAME RATE (FPS) | NUMBER OF PIXEL (pixel) | BLACK AND WHITE GRADATION (-) |
| 78 | 123 | 158% | 1/400 | 50 | 10 | 5 | 210 |
| 74 | 40 | 54% | 1/400 | 50 | 10 | 6 | 165 |
| 82 | 86 | 105% | 1/400 | 50 | 10 | 6 | 185 |
| 73 | 61 | 84% | 1/400 | 50 | 10 | 6 | 210 |
| 54 | 40 | 74% | 1/400 | 50 | 10 | 8 | 210 |

SPATTER COUNTING METHOD, COMPUTER PROGRAM, AND SPATTER COUNTING DEVICE

This application is the U.S. national phase of International Application No. PCT/JP2019/016485 filed Apr. 17, 2019 which designated the U.S. and claims priority to JP Patent Application No. 2018-081895 filed Apr. 20, 2018, the entire contents of each of which are hereby incorporated by reference.

FIELD OF THE INVENTION

The present invention relates to a spatter counting method, a computer program, and a spatter counting device.

DESCRIPTION OF RELATED ART

MAG (Metal Active Gas) welding is performed in the processing of welding a body panel of an automobile or the like in an atmosphere of an oxidizing shield gas such as carbon dioxide or a mixed gas of carbon dioxide and argon. The MAG welding is a kind of semi-automatic arc welding performed using a welding wire, and molten metal particles (spatters) may be scattered from the arc generation position to the periphery during the welding operation as in general welding. Spattering not only pollutes the surrounding environment but may cause problems such as deterioration of welding quality. It is desirable to suppress the amount of the spatters.

A spatter recognition method and a spatter recognition device that can accurately measure the generation amount of the spatters and their behavior by using an image processing device have been proposed (for example, see Patent Document 1). However, the method disclosed in Patent Document 1 requires a high-speed camera having an imaging speed of 10,000 frames/second (FPS (Frames Per Second)), and the high-speed camera is provided with a moving device. Furthermore, the spatters in the frame image for each time are specified, the continuity is judged from each frame, and the calculation processing for recognizing each spatter is also large.

The high-speed camera means a camera with a capturing speed that exceeds the normal video rate (30 frames per second: FPS). In particular, in recent years, the high-speed camera has often been referred to as an image capturing device having a FPS of over 100 FPS.

In addition to the spatter recognition method and the spatter recognition device disclosed in patent Document 1, a laser welding quality determination method and a laser quality determination device have also been proposed, by which not only the quality of the welded part by laser welding can be judged, but also a shear strength prediction and fracture mode prediction can be performed in-process, and thereby quality control can be performed corresponding to high-speed and highly accurate laser welding (for example, see Patent Document 2). However, the method disclosed in Patent Document 2 also requires a large scale and sophisticated equipment.

PRIOR ART DOCUMENTS

Patent Documents

Patent Document 1: Japanese Unexamined Patent Application, First Publication No. 2008-126274

Patent Document 2: PCT International Publication No. WO 2011/024904

DISCLOSURE OF THE INVENTION

Problem to be Solved by the Invention

As mentioned above, the conventional technology requires a large-scale and expensive device, which causes a cost problem.

Furthermore, there is a demand for a spatter counting device that can measure and be portable even when welding a narrow gap. That is, there is a demand for a technique capable of counting the spatters by a simple method while suppressing costs.

In view of the above circumstances, the present invention aims to provide a technique capable of counting the spatters by a simple method while suppressing costs.

Means to Solve the Problem

In order to achieve the object above, the present invention provides the following spatter counting methods.

A spatter counting method performed by a portable terminal device provided with an image capturing device including:
  an image capturing step of capturing a moving image of an area including spatters generated during welding: and
  a counting step of counting a number of the spatters captured in each still image constituting the moving image captured in the capturing step.

It is preferable that the spatter counting method further include an image processing step of binarization processing the moving image, and in the counting step, an area which has a black and white gradation equal to or higher than a first threshold value, and is composed of adjacent pixels having a black and white gradation equal to or higher than the first threshold, and a size of which is equal to or less than a second threshold value is counted as the spatter in each still image constituting the moving image after the binarization processing.

It is preferable that the spatter counting method further include a setting step of setting a time zone for counting the number of the spatters in a capturing time of the moving image, and in the counting step, the number of the spatters be counted in each still image constituting the moving image in the time zone set in the setting step.

It is preferable that a shutter speed of the image capturing device which is configured to capture the area in the image capturing step be in a range of $1/400$ second to $1/800$ second in the spatter counting method.

It is preferable that ISO sensitivity of the image capturing device which is configured to capture the area in the image capturing step be a value at which the spatters captured in the still image can be highlighted in the spatter counting method.

It is preferable that the spatter counting method further include a display control step of displaying the moving image and the number of the spatters counted in each still image in the counting step in association with each other on a display unit.

It is preferable that, in the display control step, the number of the spatters in each still image be displayed in a form of a graph on the display unit, and a statistical value of the number of the spatters be also displayed on the display unit in the spatter counting method.

It is preferable that the spatter counting method further include an output step of outputting the number of the spatters counted in the counting step as a file of a predetermined file format in each still image, and a communication step of transmitting the file to another device.

In order to achieve the object above, the present invention provides the following computer programs.

A computer program which causes a computer having an image capturing device and functioning as a portable terminal device to execute an image capturing step of capturing a moving image of an area including spatters generated during welding: and a counting step of counting a number of the spatters captured in each still image constituting the moving image captured in the capturing step.

It is preferable that the computer program further causes the computer to execute an image processing step of binarization processing the moving image, and in the counting step, an area which has a black and white gradation equal to or higher than a first threshold value, and is composed of adjacent pixels having a black and white gradation equal to or higher than the first threshold, and a size of which is equal to or less than a second threshold value be counted as the spatter in each still image constituting the moving image after the binarization processing.

It is preferable that the computer program further causes the computer to execute a setting step of setting a time zone for counting the number of the spatters in a capturing time of the moving image, and in the counting step, the number of the spatters be counted in each still image constituting the moving image in the time zone set in the setting step.

It is preferable that a shutter speed of the image capturing device which is configured to capture the area in the image capturing step be in a range of $1/400$ second to $1/800$ second in the computer program.

It is preferable that ISO sensitivity of the image capturing device which is configured to capture the area in the image capturing step be a value at which the spatters captured in the still image can be highlighted in the computer program.

It is preferable that the computer program further causes the computer to execute a display control step of displaying the moving image and the number of the spatters counted in each still image in the counting step in association with each other on a display unit.

It is preferable that, in the display control step, the number of the spatters in each still image be displayed in a form of a graph on the display unit, and a statistical value of the number of the spatters be also displayed on the display unit in the computer program.

It is preferable that the computer program further causes the computer to execute an output step of outputting the number of the spatters counted in the counting step as a file of a predetermined file format in each still image, and a communication step of transmitting the file to another device.

In order to achieve the object above, the present invention provides the following spatter counting devices.

A spatter counting device which is a portable terminal device including an image capturing device which is configured to capture a moving image of an area including spatters generated during welding, and a counting unit which is configured to count a number of the spatters captured in each still image constituting the moving image captured by the image capturing device.

It is preferable that the spatter counting device further include an image processing unit which is configured to binarize the moving image, and the counting unit count an area which has a black and white gradation equal to or higher than a first threshold value, and is composed of adjacent pixels having a black and white gradation equal to or higher than the first threshold, and a size of which is equal to or less than a second threshold value as the spatter in each still image constituting the moving image after the binarizing.

It is preferable that the spatter counting device further include a setting unit which is configured to set a time zone for counting the number of the spatters in a capturing time of the moving image, and the counting unit count the number of the spatters in each still image constituting the moving image in the time zone set by the setting unit.

It is preferable that a shutter speed of the image capturing device which is configured to capture the area be in a range of $1/400$ second to $1/800$ second in the spatter counting device.

It is preferable that ISO sensitivity of the image capturing device which is configured to capture the area be a value at which the spatters captured in the still image can be highlighted in the spatter counting device.

It is preferable that the spatter counting device further include a display control unit which is configured to display the moving image and the number of the spatters counted in each still image by the counting unit in association with each other on a display unit.

It is preferable that the display control unit cause the display unit to display the number of the spatters in each still image in a form of a graph on the display unit, and further cause to display a statistical value of the number of the spatters on the display unit in the spatter counting device.

It is preferable that the spatter counting device further include an output unit which is configured to output the number of the spatters counted by the counting unit as a file of a predetermined file format in each still image, and a communication unit which is configured to transmit the file to another device.

Effects of the Invention

According to the present invention, it becomes possible to count the spatters by a simple method while suppressing costs.

BRIEF DESCRIPTION OF DRAWINGS

FIG. 8 is a diagram showing experimental results.

DETAILED DESCRIPTION OF THE PREFERRED EMBODIMENTS

An embodiment of the present invention will be described below with reference to the drawings.

Figure 1:
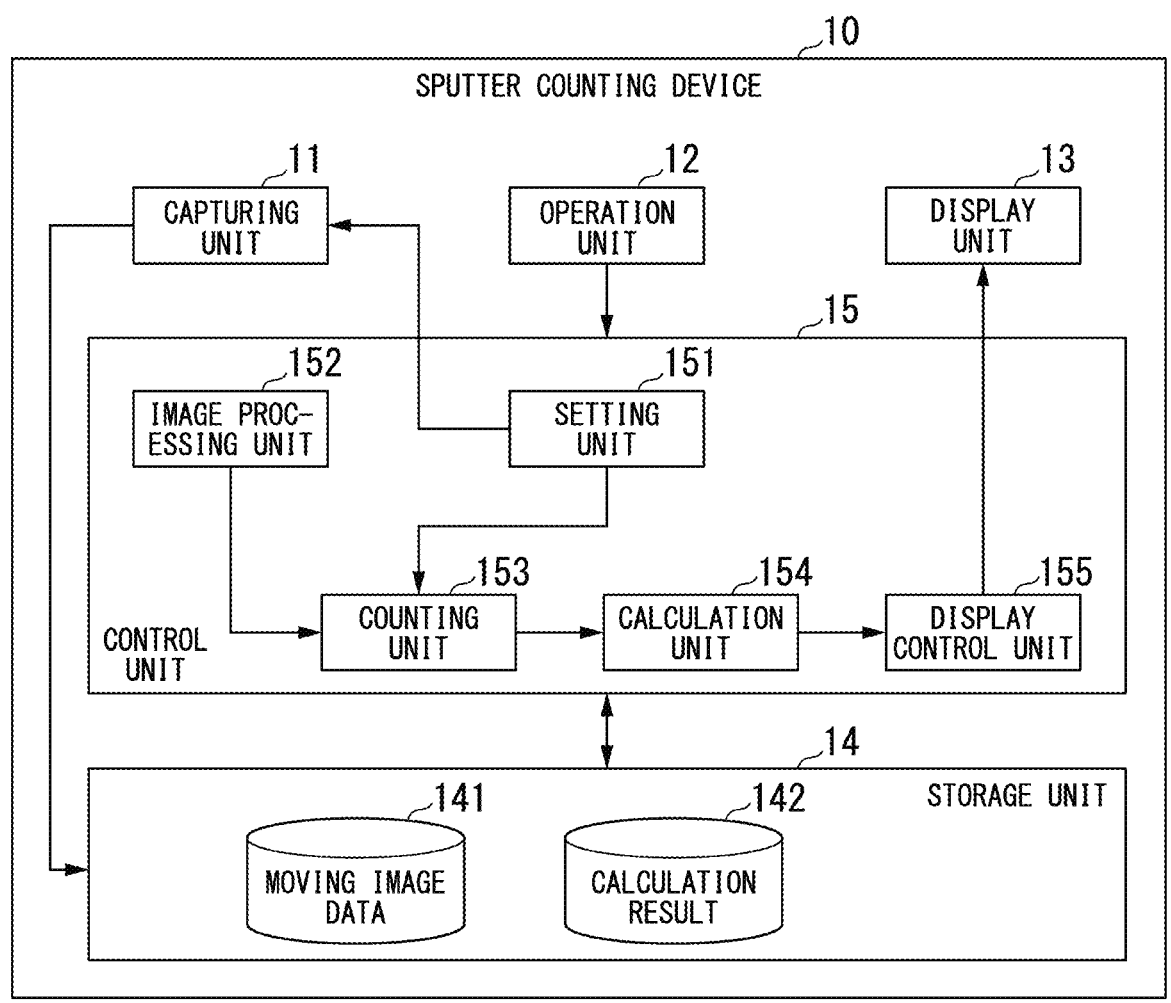
FIG. 1 is a schematic block diagram showing a functional configuration of a spatter counting device.

FIG. 1 is a schematic block diagram showing a functional configuration of a spatter counting device 10.

The spatter counting device 10 is a device that counts the spatters scattered around the arc generated during welding. The spatter counting device 10 includes a portable terminal device such as a smartphone or a tablet terminal that is equipped with an image capturing device. The spatter counting device 10 captures an area to be captured as a moving image, and counts the number of the spatters captured in each still image forming the captured moving image. In the present description, "counting the number of the spatters" means counting spatters. In the present embodiment, the area to be captured is an area in which the spatter can be captured during welding. For example, it is an area around an arc generated during welding.

The spatter counting device 10 includes an image capturing unit 11, an operation unit 12, a display unit 13, a storage unit 14 and a control unit 15.

The image capturing unit 11 is an image capturing device (for example, a camera) that captures the area to be captured with a moving image. For example, the image capturing unit 11 captures the area to be captured as a moving image based on capturing parameters set by the control unit 15. The capturing parameter is a parameter related to the setting at the time of capturing the image capturing unit 11, and is, for example, a frame rate, a shutter speed, and ISO sensitivity.

The frame rate is one of the indexes that represent the smoothness of the display of a moving image, and represents the number of images (number of frames per second) taken with the image capturing unit 11 per second. The higher the frame rate, the smoother the images. However, if the frame rate is high, the data size becomes large. The frame rate is preferably in a range of 10 FPS to 30 FPS.

The shutter speed is a time period when the shutter of the image-capturing unit 11 is open, that is, a time period when image sensor elements are exposed to the light passing through the lens. A shorter shutter speed means a clearer image can be taken. On the other hand, a longer shutter speed means more light can be secured. The shutter speed is preferably in a range of $1/400$ to $1/800$.

Figure 2:
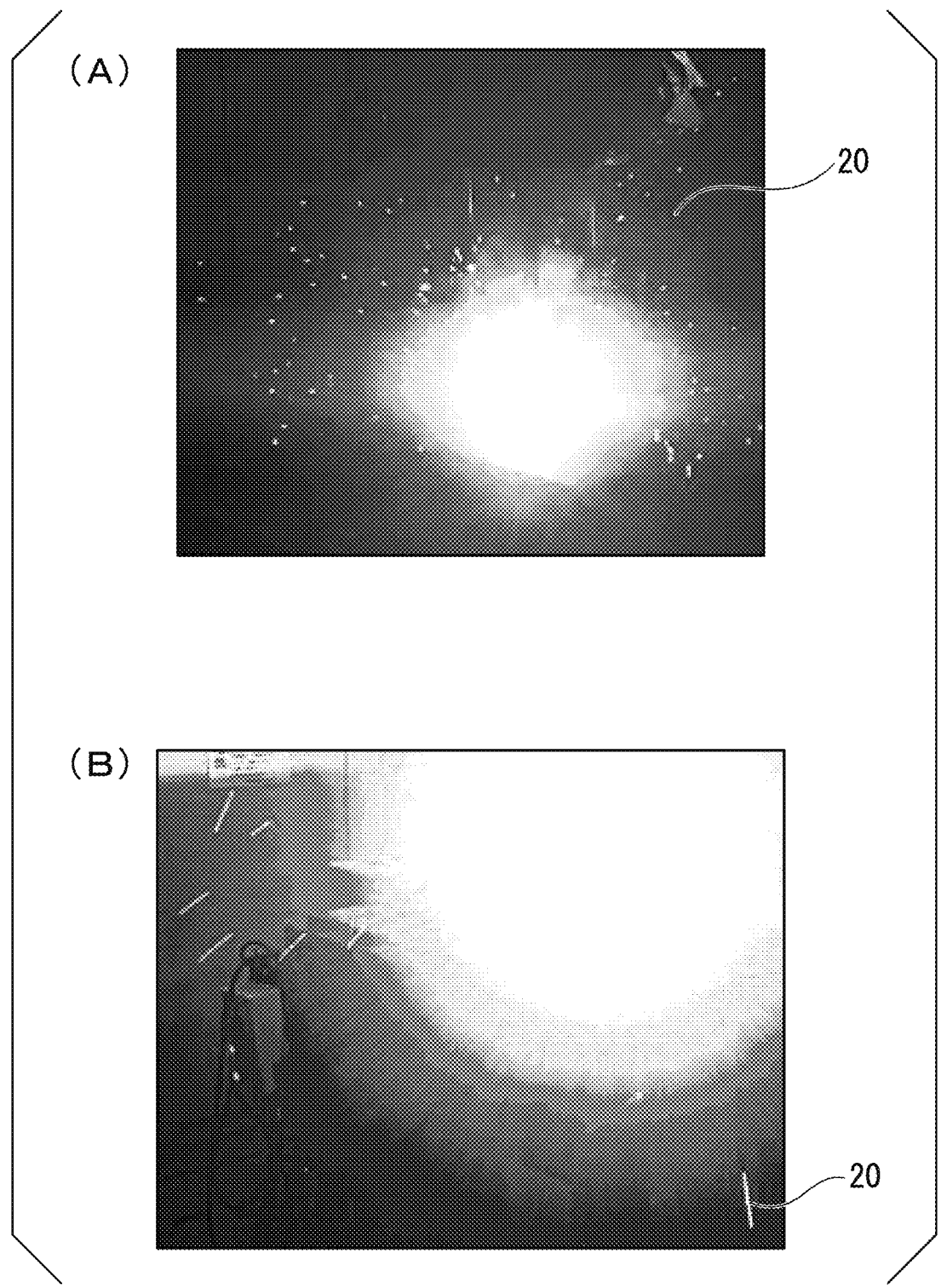
FIG. 2 is a diagram showing images when an area to be captured is captured at different shutter speeds.

FIG. 2 is a diagram showing images when the area to be captured is captured at different shutter speeds. FIG. 2(A) is a diagram in which the area to be captured is captured with a shutter speed of $1/1000$, and FIG. 2(B) is a diagram in which the area to be captured is captured with a shutter speed of $1/30$.

It is possible to catch the spatter 20 as a point by setting the shutter speed to be short. However, if the shutter speed is too short, as shown in FIG. 2(A), it is difficult to count the small spatters 20 because the amount of light cannot be secured. On the other hand, as shown in FIG. 2(B), when the shutter speed is set to be long, the spatter 20 is captured as a line, so that many spatters 20 are overlapped and counting becomes difficult.

ISO sensitivity is the degree of amplification of the light taken into the image capturing unit 11. A lower ISO sensitivity results in a darker image and a higher ISO sensitivity results in a brighter image. However, if the ISO sensitivity is too high, it causes noise. The spatter is very bright. For this reason, the ISO sensitivity is reduced to a value at which the spatters captured in the still image can be highlighted, thereby darkening the image of the surroundings (for example, the background or anything other than spatter) captured in the image and only spatter can be captured. This enables accurate counting. The ISO sensitivity is preferably 50.

The operation unit 12 includes an input device such as a touch panel and buttons. The operation unit 12 is operated by a user when the user's instruction is input to the spatter counting device 10. The operation unit 12 receives an instruction to set the capturing parameter, the image analysis parameter, and the spatter counting time. Further, the operation unit 12 may be an interface for connecting an input device to the spatter counting device 10. In this case, the operation unit 12 inputs the input signal generated by the input of a user in the input device to the spatter counting device 10.

The image analysis parameter is a parameter used for counting spatters, and is, for example, a detection size and a light detection accuracy. The detection size is a threshold value of the size (the number of pixels) recognized as the spatter. Since the spatter has a small size, if the detection size is large, a light bulb, an arc, etc. may be erroneously detected as the spatter. If the detection size is too small, the count of the spatters will be missed. The detection size is preferably in a range of 5 pixels to 8 pixels, and more preferably 6 pixels.

The light detection accuracy is a threshold value that represents the blackness and whiteness of the image after the binarization processing. The light detection accuracy represents the black and white gradation of 0 to 255 by binarization. Black is 0 and white is 255. The preferred range of the light detection accuracy is in a range of 165 to 225.

Further, the spatter counting time is a time zone in which the number of the spatters is counted in the moving image capturing time.

The display unit 13 is an image display device such as a liquid crystal display and an organic EL (Electro Luminescence) display. The display unit 13 displays the counting result of the spatters. The display unit 13 may be an interface for connecting the image display device to the spatter counting device 10. In this case, the display unit 13 generates an image signal for displaying the spatter counting device 10 and outputs the image signal to the image display device connected to itself.

The storage unit 14 includes a storage device such as a magnetic hard disk device or a solid state drive. The storage unit 14 stores the moving image data 141 and the calculation result 142. The moving image data 141 is data of a moving image captured by the image capturing unit 11. The calculation result 142 is a calculation result such as a statistical value of the spatters obtained based on the counting result of the spatters by the control unit 15.

Figures 3, 4:
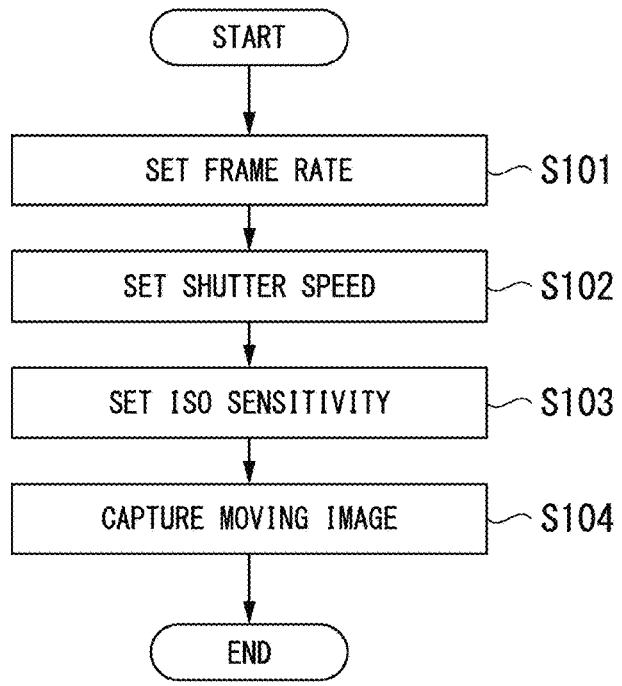
FIG. 3 is a diagram showing an example of calculation results stored in a storage unit.
FIG. 4 is a flowchart showing a flow of processing before start of capturing in a spatter counting device according to the present embodiment.

FIG. 3 is a diagram showing an example of the calculation result 142 stored in the storage unit 14.

As shown in FIG. 3, as the calculation result 142, the moving image ID, the moving image data, the still image ID, the still image data, the number of the spatters, and the statistical value are associated. The value of the moving image ID is identification information for identifying the moving image. The value of the moving image data is the data of the moving image identified by the moving image ID. The value of the still image ID is identification information for identifying the still images forming the moving image. The value of the still image data is the data of the still image identified by the still image ID. The value of the number of the spatters is the number of spatters captured in the still image. The number of the spatters is obtained in each still image.

The statistic value is the statistical value of the spatters counted in the moving image data identified by the moving image ID. In FIG. 3, the maximum value, the minimum value, the cumulative value, and the average value are shown as the statistical value. The maximum value is the maximum number of the spatters counted in one still image. The minimum value is the minimum number of the spatters counted in one still image. The cumulative value is the total number of the spatters counted in one moving image data as a whole. The average value is the average number of the spatters counted in one moving image data. The average value is calculated by dividing the cumulative value by the number of the still images forming one moving image data.

Returning to FIG. 1 and continuing the explanation.

The control unit 15 includes a processor such as a CPU (Central Processing Unit) and a GPU (Graphics Processing Unit) and a memory. The control unit 15 functions as a setting unit 151, an image processing unit 152, a counting unit 153, a calculation unit 154 and a display control unit 155 by executing a program.

The setting unit 151 sets the capturing parameter, the image analysis parameter and the spatter counting time input via the operation unit 12. For example, the setting unit 151 sets the capturing parameter in the image capturing unit 11. Also, for example, the setting unit 151 sets the spatter counting time in the image processing unit 152. Further, for example, the setting unit 151 sets the image analysis parameter in the counting unit 153.

The image processing unit 152 performs image processing on the moving image data 141 stored in the storage unit 14. Specifically, first, the image processing unit 152 reads out one moving image data from the moving image data 141 stored in the storage unit 14. For example, the image processing unit 152 reads out moving image data designated by a user. Next, the image processing unit 152 extracts, from the read moving image data, moving image data corresponding to the spatter counting time input via the operation unit 12. After that, the image processing unit 152 performs an erosion processing and a dilation processing on the extracted moving image data, and then converts the extracted moving image data into black and white moving image data.

The counting unit 153 counts the number of the spatters captured in the moving image data that has been subjected to the image processing by using the moving image data that has been subjected to the image processing by the image processing unit 152 and the image analysis parameter set by the setting unit 151. Specifically, the counting unit 153 counts the area that satisfies the condition indicated by the image analysis parameter as a spatter, and counts the number of the spatters in each still image that constitutes the moving image data that has been subjected to the image processing.

One still image will be described as an example. First, the counting unit 153 searches pixels of which the black and white gradation is equal to or higher than the set threshold value in the still image. Next, the counting unit 153 compares a size of an area, which is composed of adjacent pixels having the black and white gradation equal to or higher than the threshold value, and a predetermined detection size. When the size of the area which is composed of adjacent pixels having the black and white gradation equal to or higher than the threshold value is equal to or smaller than the predetermined detection size, the counting unit 153 determines that the area is an area that satisfies the condition indicated by the image analysis parameter, and counts as spatter.

The calculation unit 154 calculates the statistical value regarding the number of the spatters in the moving image data 141 based on the result counted by the counting unit 153. The statistical values regarding the number of the spatters are the maximum value, the minimum value, the average value, and the cumulative value. The calculation unit 154 stores the calculation result of the statistical value in the storage unit 14 in association with the moving image data as the calculation result 142.

The display control unit 155 controls the display of the display unit 13. For example, the display control unit 155 causes the display unit 13 to display the moving image data and the counted number of the spatters in each still image in association with each other. Further, for example, the display control unit 155 displays the number of the spatters in each still image in the form of a graph on the display unit 13, and further displays the statistical value of the number of the spatters on the display unit 13.

FIG. 4 is a flowchart showing a flow of processing before the start of capturing in the spatter counting device 10 in this embodiment.

A user inputs the frame rate to the spatter counting device 10 via the operation unit 12. The setting unit 151 sets the image capturing unit 11 so to achieve the frame rate input via the operation unit 12 (step S101). The user inputs the shutter speed to the spatter counting device 10 via the operation unit 12. The setting unit 151 sets the image capturing unit 11 so as to achieve the shutter speed input via the operation unit 12 (step S102). The user inputs the ISO sensitivity to the spatter counting device 10 via the operation unit 12. The setting unit 151 sets the image capturing unit 11 so as to achieve the ISO sensitivity input via the operation unit 12 (step S103). By the processing from step S101 to step S103, the capturing parameters are set to image capturing unit 11. After that, the image capturing unit 11 captures an area to be captured with a moving image according to the user's operation (step S104).

Figure 5:
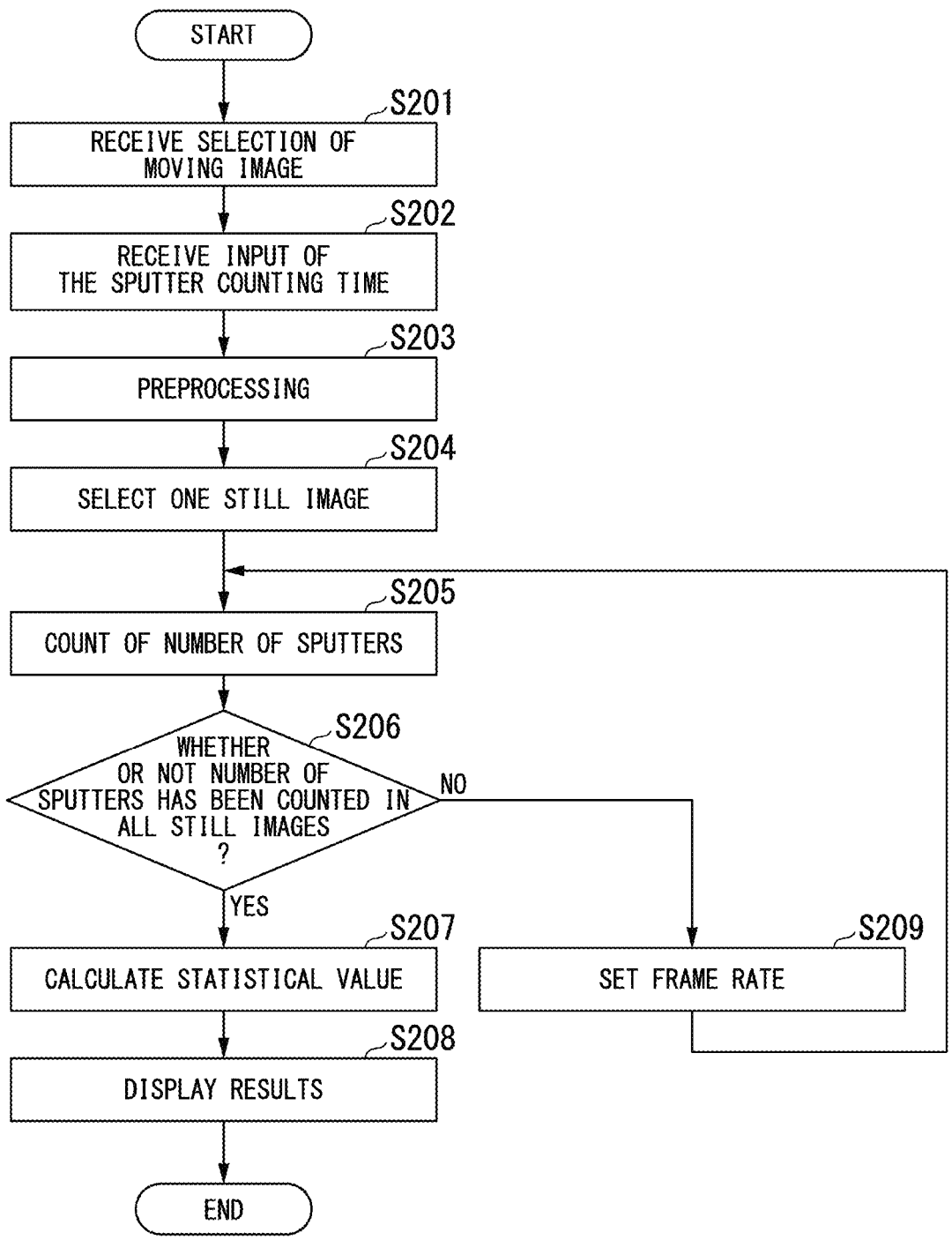
FIG. 5 is a flowchart showing a flow of spatter counting processing in a spatter counting device according to the present embodiment.

FIG. 5 is a flowchart showing a flow of spatter counting processing in the spatter counting device 10 in this embodiment.

The display control unit 155 displays a list of the moving image data 141 stored in the storage unit 14 on the display unit 13 according to the user's operation, and receives the selection of the moving image from the user (step S201). When the moving image is selected, the operation unit 12 outputs information (for example, moving image ID) regarding the selected moving image to the image processing unit 152. Next, the operation unit 12 receives the input of the spatter counting time (step S202). When the spatter counting time (start time and end time) is input, the operation unit 12 outputs the input of the spatter counting time to the image processing unit 152.

The image processing unit 152 acquires the moving image data identified by the output moving image ID from the moving image data 141. Then, the image processing unit 152 performs preprocessing on the acquired moving image data (step S203). Specifically, first, the image processing unit 152 extracts the moving image data corresponding to the spatter counting time input through the operation unit 12 from the read moving image data. After that, the image processing unit 152 performs the erosion processing and the dilation processing on the extracted moving image data, and then converts the extracted moving image data into black and white moving image data by binarization processing. The image processing unit 152 outputs the moving image data after the image processing to the counting unit 153.

The counting unit 153 selects one still image from the still images forming the moving image data output from the image processing unit 152 (step S204). For example, the counting unit 153 selects the first still image among the still images that constituting the moving image data. The counting unit 153 counts the number of the spatters captured in the selected still image based on the image analysis parameter set by the setting unit 151 (step S205). Specifically, the counting unit 153 judges the area which has the black and white gradation equal to or higher than the first threshold value, and is composed of adjacent pixels having a black and white gradation equal to or higher than the first threshold, the size of which is equal to or less than the second threshold value as the spatter, and counts the number of the spatters.

After that, the counting unit 153 determines whether or not the number of the spatters has been counted in all still images (step S206). When the number of the spatters has been counted in all still images (step S206—YES), the counting unit 153 associates each still image with the information of the counted number of the spatters and outputs it to the calculation unit 154. The calculation unit 154 calculates the statistical value based on the information output from the counting unit 153 (step S207). Specifically, the calculation unit 154 calculates the maximum value, the minimum value, the average value, and the cumulative value based on the information (for example, the number of the spatters) output from the counting unit 153. The calculation unit 154 stores the calculated result in the storage unit 14 as the calculation result 142. The calculation unit 154 also outputs the calculated result to the display control unit 155.

Figure 6:
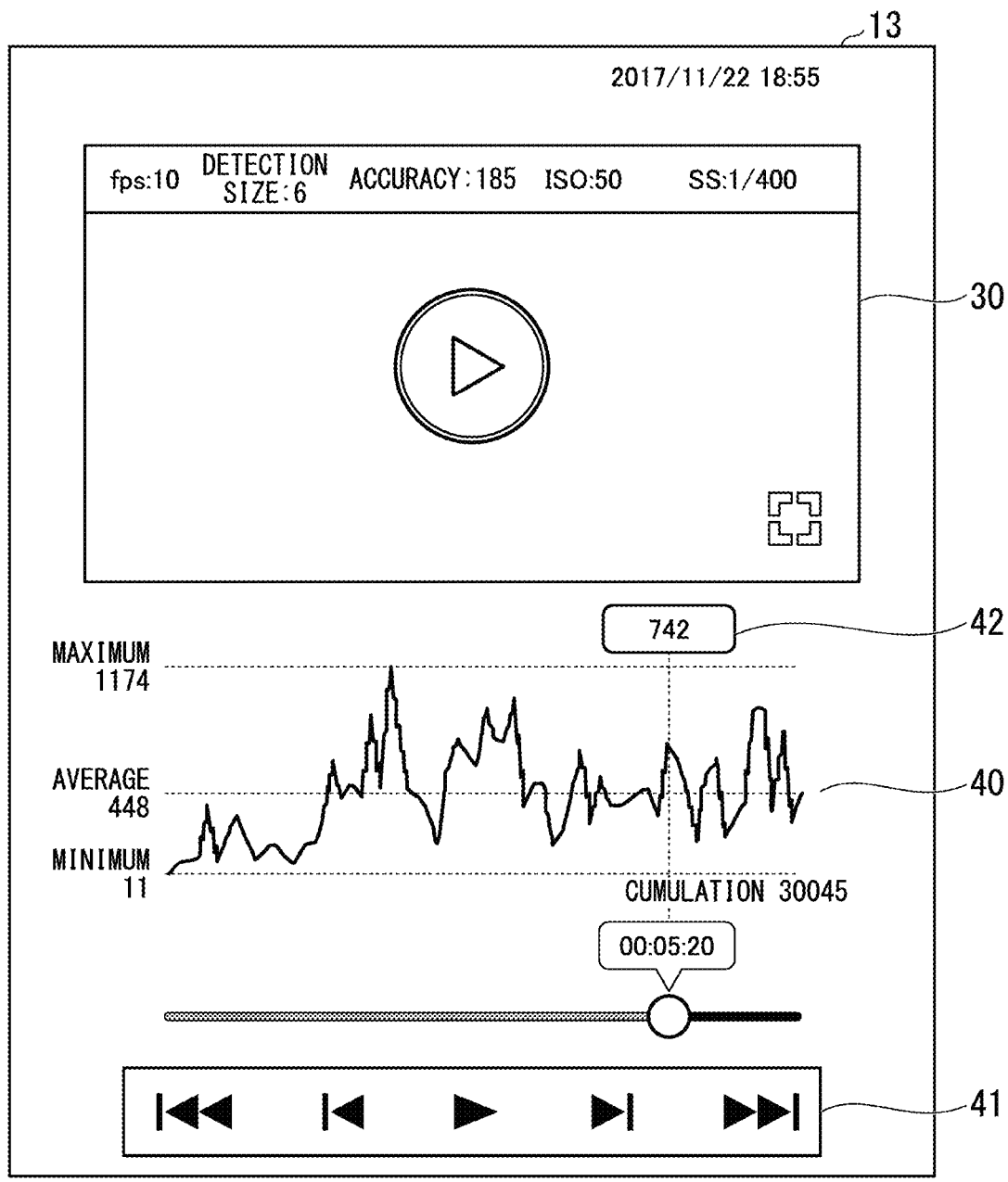
FIG. 6 is a diagram showing an example of a screen displayed by a display unit.

The display control unit 155 displays the results output from the calculation unit 154 on the display unit 13. Specifically, the display control unit 155 uses the calculation result 142 stored in the storage unit 14 to produce image data of displaying the screen shown in FIG. 6, and displays the produced screen data on the display unit 13. FIG. 6 is a diagram showing an example of a screen displayed by the display unit 13. As shown in FIG. 6, the display unit 13 displays a moving image 30, a graph 40, statistical values ("maximum", "minimum", "average", and "cumulation" in FIG. 6), and an instruction input unit 41.

The moving image 30 is moving image data selected by the user. The graph 40 is a result of graphing the number of the spatters in each still image that constitutes the moving image data selected by the user in chronological order. The instruction input unit 41 is an input unit used when inputting an instruction such as reproduction, stop, fast forward, and fast rewind of the moving image 30.

The display control unit 155 associates the still image at each time with the number of the spatters counted in the still image. Then, the display control unit 155 displays the number of the spatters counted in the still image corresponding to the reproduction time of the moving image 30 as an instantaneous value 42 in synchronization with the reproduction of the moving image 30. For example, FIG. 6 shows an example in which the reproduction time of the moving image 30 is "5 minutes 20 seconds" and the number of the spatters counted in the still image at "5 minutes 20 seconds" is "742". The display unit 13 displays the result output from the calculation unit 154 according to the control of the display control unit 155 (step S208).

If the number of the spatters is not counted in all the still images in the processing of step S206 (step S206-NO), the counting unit 153 selects another still image (step S209). For example, the counting unit 153 selects a still image in which the number of the spatters is not counted. After that, the counting unit 153 executes the processing from step S205.

Next, the accuracy of the spatter counting method, the computer program, and the spatter counting device according to the present invention will be described by way of experiments.

Figure 7:
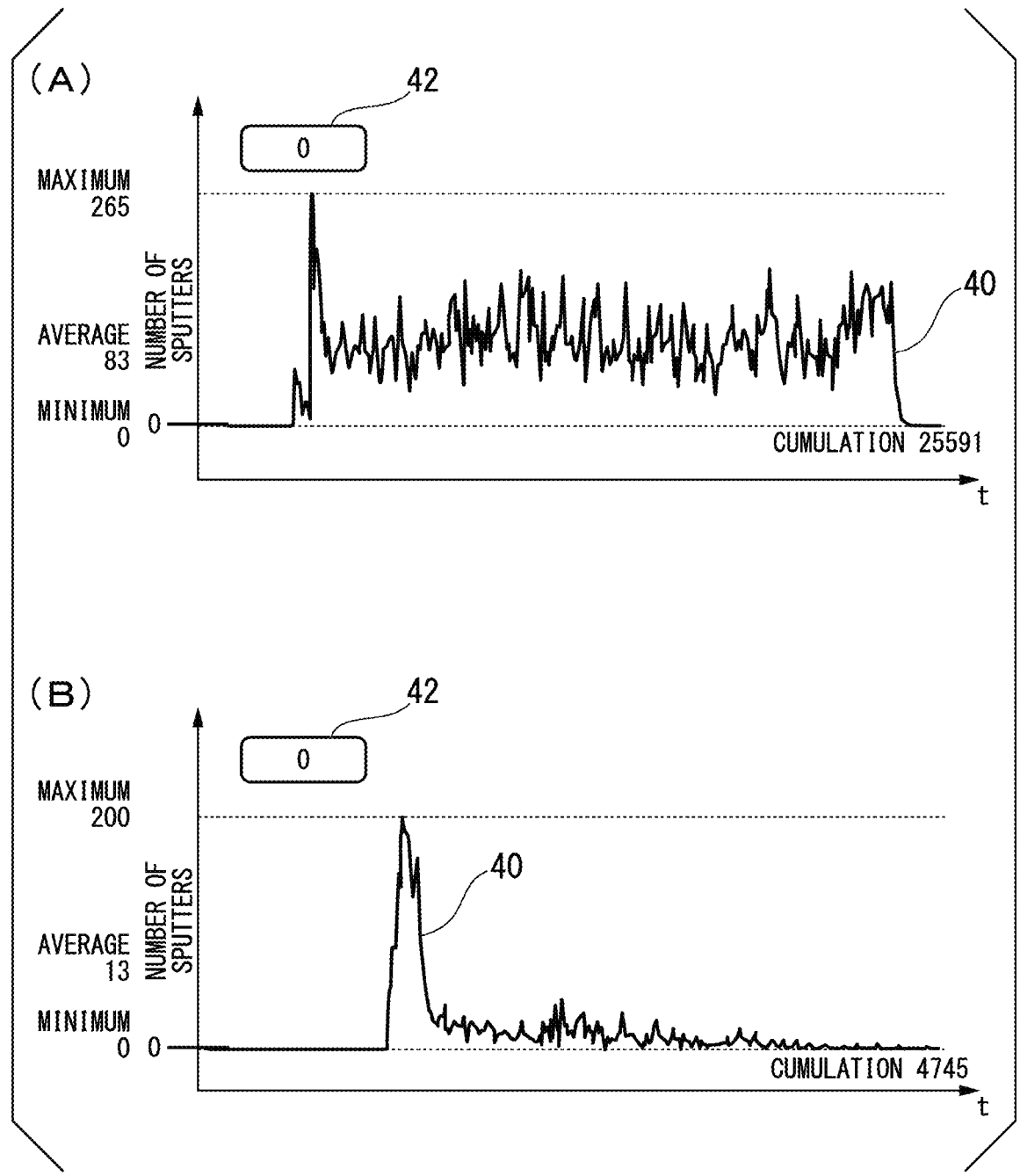
FIG. 7 is a diagram showing results of counting a number of spatters under different welding conditions.

FIG. 7 is a diagram showing the results of counting the number of the spatters under different welding conditions. The parameters in the capturing step and the parameters in the counting step are the same, and only the welding conditions are different.

FIG. 7(A) is a diagram showing the counting result of the spatters under welding conditions in which the amount of the spatters is large, and FIG. 7(B) is a diagram showing the counting result of the spatters in welding conditions in which the amount of the spatters is small. With reference to FIG. 7, a clear difference can be confirmed.

In addition, in order to improve the accuracy of the present invention, the number of the spatters was counted by various parameters, and the results of the present invention were compared with the results of visual measurement of still images. Here, an experiment was conducted under the following conditions with the capturing parameter and the image analysis parameter in the present invention.

<Capturing Parameter>

Frame rate: Fixed at 10 FPS because it does not affect the counting result of still images ISO sensitivity: 50

Shutter speed: Fixed at $1/1,000$ and $1/400$. If the shutter speed is more than $1/400$, the spatters are captured in a linear shape, so that the number of the spatters cannot be accurately counted.

<Image Analysis Parameters>

Detection size: 5, 6, and 8 pixels were used as the threshold value.

Light detection accuracy: Any value between 165 and 225 (for example, 165, 185, 210) was used as the threshold value.

FIG. 8 shows the experimental results.

As shown in FIG. 8, when comparing the case in which the black and white gradation is 210 and the number of the pixels is 5, 6, and 8, the ratio of the number of the spatters according to this embodiment with respect to the number of the spatters by visual observation is 84% when the number of the pixels is 6. From this, it can be understood that the measurement with the detection size of 6 pixels is the closest to the visual measurement, that is, when the number of the pixels is 6, the detection can be performed with high accuracy. Further, when comparing the ratio of the number of the spatters according to this embodiment with respect to the number of the spatters by visual observation in the case in which the black and white gradation is 165, 185, and 210, the case in which the black and white gradation is 185 has the closest result to the visual measurement. That is, it can be understood that the detection can be performed with high accuracy.

The spatter counting device 10 configured as described above is a portable terminal device provided with the image capturing unit 11, and carries out both capturing the area in which the spatters can be captured, and counting the number of the spatters in the captured moving images in the same housing. That is, the capturing of the spatters and the counting of the number of the spatters can be performed with one housing. Further, since it is a portable terminal device, the size of the device does not increase and the cost can be reduced. Therefore, it becomes possible to count the number of the spatters by a simple method while suppressing the cost.

Further, the spatter counting device 10 counts the area which has the black and white gradation equal to or higher than the first threshold value, and is composed of adjacent pixels having a black and white gradation equal to or higher than the first threshold value, the size of which is equal to or lower than the second threshold value as the spatter. Since the spatter is captured in white, the spatter counting device 10 searches the pixels of which the black and white gradation is equal to or higher than the first threshold value (value closer to white), and obtains the size of the area which is composed of adjacent pixels having a black and white gradation equal to or higher than the first threshold value. Further, since the spatter is small, the spatter counting device 10 counts the area of which the size is equal to or less than the second threshold value as the spatter, and does not count the areas of which the size is larger than that of the spatter, such as a light bulb or an arc, as the spatter. By such processing, the number of the spatters can be counted more accurately.

In addition, the spatter counting device 10 sets the time zone that for counting the number of the spatters in the capturing time of the moving image, extracts only the moving image data corresponding to the set time zone, and counts the number of the spatters. As a result, the volume of the moving image data can be reduced and the calculation of the average value of the number of the spatters can be made more accurate. Therefore, the number of the spatters can be counted more accurately.

By setting the shutter speed of the image capturing unit 11 in the range of 1/400 second to 1/800 second, it is possible to capture the spatter as a point, and suppress the volume of the moving image data.

By setting the ISO sensitivity of the image capturing unit 11 to a value that allows the spatters captured in the still image to be highlighted, the spatters can be detected with better control.

In addition, the spatter counting device 10 graphs the moving image and the number of the spatters in each still image constituting the moving image, and displays the graph on the display unit 13, and also displays the statistical value of the number of the spatters on the display unit 13. This makes it possible to show the counting result of the spatters to the user in a more understandable state.

In addition, the spatter counting device 10 is a portable terminal device such as a smartphone or a tablet terminal. Therefore, during welding, the user can easily capture images even while wearing a mask. It is possible to improve convenience.

Modification

The spatter counting device 10 may be configured to output the calculation result 142 as a file in CSV file format. The spatter counting device 10 may send the output file to another device. When the spatter counting device 10 sends the output file to another device, the spatter counting device 10 includes an output unit and a communication unit. The output unit outputs the calculation result 142 as a file in the CSV file format. The communication unit transmits the output file to another device (for example, a personal computer using a communication device such as mail).

With such a configuration, it is possible to widely use the data.

In addition, the spatter counting device 10 may be configured to print and output the output file.

The computer may operate the spatter counting device 10 in the embodiment above. In that case, the program for realizing this function may be recorded in computer-readable recording media, and the program recorded in the recording medium may be read by a computer system and executed. The "computer system" mentioned here includes an OS and hardware such as peripheral devices. Further, the "computer-readable recording media" refers to portable media such as a floppy disk, a magneto-optical disk, a ROM, a CD-ROM, or a storage device such as a hard disk built in a computer system. Further, the "computer-readable recording media" may include one which holds the program dynamically for a short time, for example, a communication line for sending programs through networks such as the Internet and communication lines such as telephone lines, and one which holds the program for a certain period of time, for example, a volatile memory inside the computer system that serves as a server or client. Further, the program may be one which realizes some of the functions described above, one which realizes the functions described above in combination with a program already recorded in a computer system, or one which realizes using a programmable logic device such as FPGA (Field-Programmable Gate Array).

The embodiment of the present invention has been described in detail above with reference to the drawings, but the specific configuration is not limited to this embodiment, and the design and the like may be changed without departing from the scope of the invention.

EXPLANATION OF REFERENCE NUMERAL 10 spatter counting device
11 capturing unit
12 operation unit
13 display unit
14 storage unit
15 control unit
151 setting unit
152 image processing unit
153 counting unit
154 calculation unit
155 display control unit

The invention claimed is:

1. A spatter counting method performed by a portable terminal device provided with a processor, an image capturing device, and a display device, the method comprising:
    an image capturing step of in which the image capturing device captures a moving image of an area including spatters generated during welding;
    an image processing step in which the processor performs binarization processing of the moving image;
    a counting step in which the processor counts a number of the spatters captured in each still image constituting the moving image captured in the image capturing step after the binarization processing, each spatter being an area having a black and white gradation equal to or higher than a first threshold value, being composed of adjacent pixels having a black and white gradation equal to or higher than the first threshold value, and having a size equal to or less than a second threshold value; and
    a display control step in which the display device displays the moving image, the number of the spatters counted in each still image in the counting step in association with each other, and a statistical value of the number of the spatters,
    wherein the number of the spatters in each still image is displayed in the form of a graph.

2. The spatter counting method according to claim 1, wherein the spatter counting method further comprises a setting step of setting a time zone for counting the number of the spatters in a capturing time of the moving image, and
    in the counting step, the number of the spatters is counted in each still image constituting the moving image in the time zone set in the setting step.

3. The spatter counting method according to claim 1,
wherein a shutter speed of the image capturing device which is configured to capture the area in the image capturing step is in a range of 1/400 second to 1/800 second.

4. The spatter counting method according to claim 1,
wherein ISO sensitivity of the image capturing device which is configured to capture the area in the image capturing step is a value at which the spatters captured in the still image can be highlighted.

5. The spatter counting method according to claim 1,
wherein the spatter counting method further comprises:
an output step of outputting the number of the spatters counted in the counting step as a file of a predetermined file format in each still image; and
a communication step of transmitting the file to another device.

6. A non-transitory computer readable medium configured to cause a computer having an image capturing device and a display device and functioning as a portable terminal device to:
execute an image capturing step in which the image capturing device captures a moving image of an area comprising spatters generated during welding;
execute an image processing step in which the computer performs binarization processing of the moving image;
a counting step in which the computer counts a number of the spatters captured in each still image constituting the moving image captured in the image capturing step after the binarization processing, each spatter being an area having a black and white gradation equal to or higher than a first threshold value, being composed of adjacent pixels having a black and white gradation equal to or higher than the first threshold value, and having a size equal to or less than a second threshold value; and
a display control step in which the display device displays the moving image, the number of the spatters counted in each still image in the counting step in association with each other, and a statistical value of the number of the spatters,
wherein the number of the spatters in each still image is displayed in the form of a graph.

7. The non-transitory computer medium according to claim 6,
wherein the non-transitory computer medium is further configured to cause the computer to execute a setting step of setting a time zone for counting the number of the spatters in a capturing time of the moving image, and
in the counting step, the number of the spatters is counted in each still image constituting the moving image in the time zone set in the setting step.

8. The non-transitory computer readable medium according to claim 6,
wherein a shutter speed of the image capturing device which is configured to capture the area in the image capturing step is in a range of 1/400 second to 1/800 second.

9. The non-transitory computer readable medium according to claim 6,
wherein ISO sensitivity of the image capturing device which is configured to capture the area in the image capturing step is a value at which the spatters captured in the still image can be highlighted.

10. The non-transitory computer readable medium according to claim 6,
wherein the non-transitory computer readable medium is further configured to cause the computer to execute an output step of outputting the number of the spatters counted in the counting step as a file of a predetermined file format in each still image, and
a communication step of transmitting the file to another device.

11. A spatter counting device which is a portable terminal device comprising:
an image capturing device configured to capture a moving image of an area including spatters generated during welding;
an image processing unit configured to binarize the moving image; and
a counting unit configured to count a number of the spatters captured in each still image constituting the moving image captured by the image capturing device after the moving image is binarized, each spatter being an area having a black and white gradation equal to or higher than a first threshold value, being composed of adjacent pixels having a black and white gradation equal to or higher than the first threshold value, and having a size equal to or less than a second threshold value;
a display unit; and
a display control unit configured to display the moving image, the number of the spatters counted in each still image by the counting unit in association with each other, and a statistical value of the number of the spatters on the display unit,
wherein the display control unit is configured to display number of the spatters in each still image on the display unit in the form of a graph.

12. The spatter counting device according to claim 11,
wherein the spatter counting device further comprise a setting unit which is configured to set a time zone for counting the number of the spatters in a capturing time of the moving image, and
the counting unit count the number of the spatters in each still image constituting the moving image in the time zone set by the setting unit.

13. The spatter counting device according to claim 11,
wherein a shutter speed of the image capturing device which is configured to capture the area is in a range of 1/400 second to 1/800 second.

14. The spatter counting device according to claim 11,
wherein ISO sensitivity of the image capturing device which is configured to capture the area is a value at which the spatters captured in the still image can be highlighted in the spatter counting device.

15. The spatter counting device according to claim 11,
wherein the spatter counting device further comprise:
an output unit which is configured to output the number of the spatters counted by the counting unit as a file of a predetermined file format in each still image; and
a communication unit which is configured to transmit the file to another device.

* * * * *